Patented Dec. 10, 1929

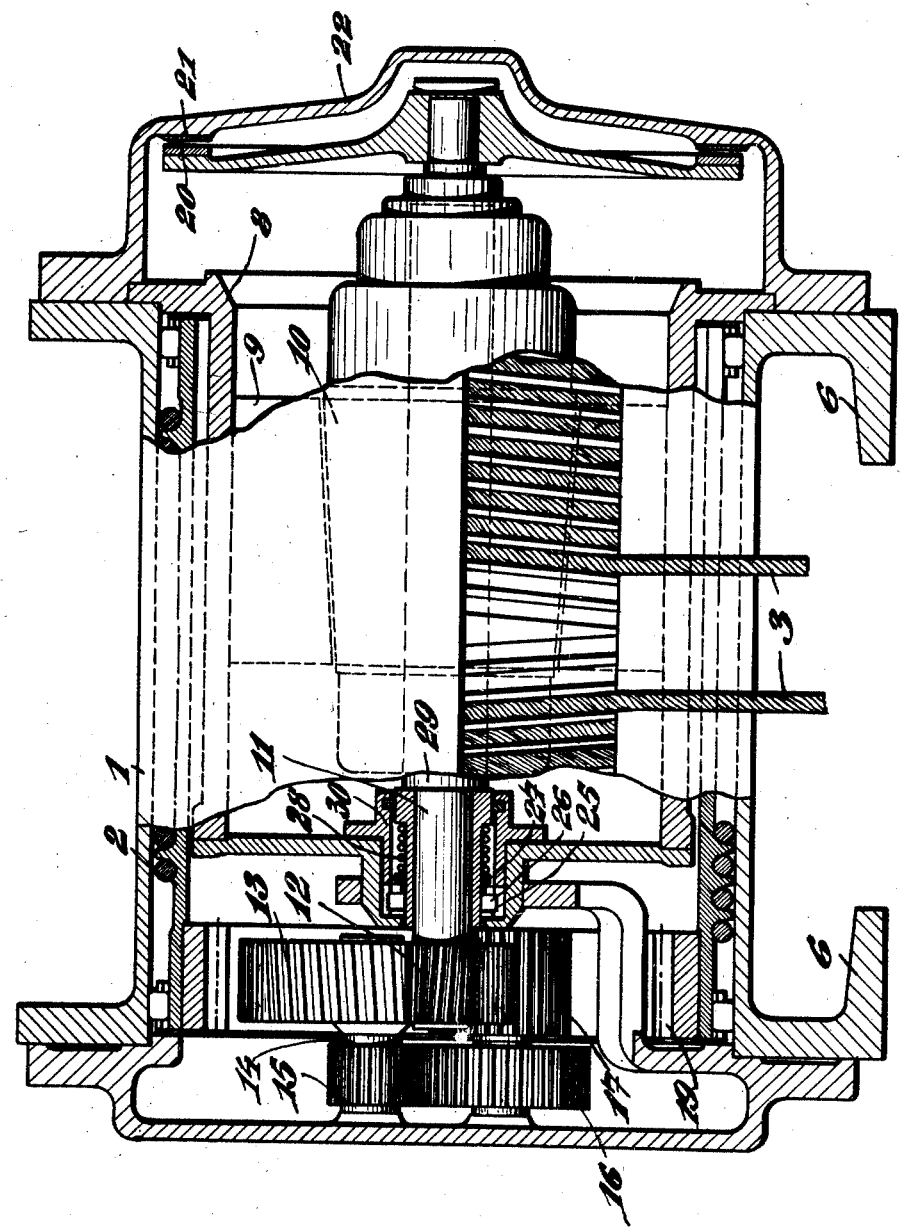

1,738,811

UNITED STATES PATENT OFFICE

PAUL WILSING, OF DUISBURG, GERMANY

BRAKE GEAR FOR ELECTRIC WINCHES

Application filed October 20, 1927, Serial No. 227,538, and in Germany March 3, 1927.

In electric winches considerable use is made of thrust brakes (axial pressure brakes), in which the brake pressure is proportional to the load. When, however, the load is being lowered under current, these brakes cause a very considerable loss and moreover the empty hook cannot be immediately braked. For this reason other electric brakes have been employed, but they have the disadvantage that their brake pressure is constant, that is to say it is independent of the load. Furthermore, various kinds of lifting gear have been provided with both types of brake.

The winch according to the invention is provided with a simple brake gear that combines the advantages of the brakes hereinbefore described, but has not their disadvantages. The brake according to the invention is applied by the load itself, and the brake pressure is proportional to the load pressure; on the other hand, the brake is released electrically upon lowering. The two parts—namely, the member for transferring the load pressure and the electric part—operate the same brake; while the winch is thus just as simple as the winches of known construction, there is no loss of work upon lowering in the use of current, but it has on the other hand the advantage that the braking action becomes greater as the load increases.

A suitable magnet may be employed for releasing the brake. The braking gear is simpler still if the magnetic tension of the stator field of the driving motor is utilized for producing an axial movement of the armature in order to apply the brake.

The load pressure brake is defective in so far as the empty hook or the hook fittings and the rope usually exert an axial pressure that is so slight that the friction is not even overcome in the brake rods, that is to say, the brake is not applied at the right moment when the hook is empty. The hook falls rapidly without any braking action. A spring acting upon the braking gear is therefore provided for enabling the unloaded hook to be braked instantaneously, and having for its purpose to exert only the small axial pressure that is necessary for holding the empty or only slightly loaded hook. The spring may be a very small one, and therefore it may be easily applied. The small axial pressure of the spring may be absorbed by the radial pressure roller bearing which receives the pressure of the teeth of the motor driving wheel.

The invention is illustrated in the accompanying drawing, which shows one form of the winch in partial longitudinal section.

In the drawing, the casing 1 contains the winch drum 2, from which the rope unwinds in known manner towards the running block with the load hook. The casing is supported upon two supports 6.

The winch drum is operated by a motor 8, which is fixed to the casing 1, and extends into the drum 2. The stator 9 and the rotor 10 are conical in form, so that when the motor is started the rotor under magnetic tension assumes the position shown in the drawing. The motor shaft 11 has mounted upon it the driving pinion 12, which engages in a toothed wheel 13. The pinion 12 and toothed wheel 13 are provided with inclined teeth which are so shaped that the load pressure causes the rotor shaft 11 to move towards the right. The pinion 15 is connected to the toothed wheel 13, which is mounted on the pin or spindle 14. The toothed wheel 16 is mounted upon its shaft and engages with the toothed wheel 17. Engagement with the internal toothed wheel 19 of the drum 2 is effected by a further toothed wheel not shown in the drawing.

If the motor is switched off, the shaft 11 gives way to the axial pressure, and in moving to the right presses a brake disc 20, keyed on the end of the motor shaft against the stationary brake contact face 21 of the cover plate 22.

The brake is released upon the re-starting or lowering in the maner described, by the magnetic tension of the stator field of the driving motor 8, the rotor 10 being again moved to the left and the brake disc 20 moved away from the brake contact face.

The radial pressure of the driving pinion 12 is absorbed by the roller bearing 25, which may be fixedly held inside the motor casing. A bush or ring 27 is pressed by a helical spring 28 against the rollers 26 of the roller bearing, the other end of the spring pressing aginst a collar 29 on the shaft 11. The object of the spring is to move the armature and the brake disc 20 into the braking position, while overcoming friction, at the moment when the weight of the lift hook or a small working load alone would be insufficient for the purpose. The axial pressure exerted by the spring passes through the bush or ring 27 to the rollers 26 and is absorbed by the latter. The spring and roller bearings are protected by a cover plate.

I claim:

1. An automatically operating brake gear for electrically driven winches consisting of a brake, a member which is actuated by the pressure of the load through the load rope and adapted to serve for the application of the brake, an electric releasing device for the brake controlled by the motor current, and means adapted for connecting these parts together, substantially as hereinbefore described.

2. A brake gear as specified in claim 1, in which the releasing gear of the brake is formed by the rotor of the electric driving motor, which is actuated by the magnetic axial tension of the stator field of the motor, and whose axial movement causes the brake to be applied and released, substantially as hereinbefore described.

3. An automatically operating brake gear for electrically driven winches, consisting of a brake, a member which is actuated by the pressure of the load and is adapted to serve for the application of the brake, an auxiliary pressure member operating in the braking direction and adapted for braking the unloaded rope, a releasing device controlled by the motor current, and means adapted to connect these parts together, substantially as hereinbefore described.

4. An automatically operating brake gear for electric winches, comprising a brake, a motor shaft which causes the operation of the brake by axial movement and releases the brake under the action of the magnetic axial tension of the stator field when the motor is running, a driving pinion having inclined teeth and mounted on the motor shaft and acting upon the winch drum through transmission gear, the braking movement of the motor shaft being produced by the axial pressure of the driving pinion and an axially pressing spring provided on the motor shaft adapted for braking the unloaded rope, substantially as hereinbefore described.

5. Means for braking the unloaded rope in a brake gear applicable to electric winches as specified in claim 4, comprising in combination, means on the motor shaft against which one end of the axially pressing spring presses, an abutment ring for holding the other end of the said spring, a roller bearing for receiving the axial pressures which act upon the motor shaft, and a supporting ring pressing against the rollers of the roller bearing so that the rollers receive the axial pressure of the said spring, substantially as described.

PAUL WILSING.